United States Patent [19]

Blase et al.

[11] Patent Number: 5,259,932
[45] Date of Patent: Nov. 9, 1993

[54] HEATING SYSTEM FOR REGENERATIVE COKE OVENS

[75] Inventors: Manfred Blase, Essen; Ulrich Kochanski, Bochum; Dietrich Wagener; Günther Meyer, both of Essen; Heinz Dürselen, Velbert; Dieter Stalherm, Recklinghausen; Joachim Hoitz, Herten; Ludwig Offermann, Olfen; Jürgen Tietze, Bochum, all of Fed. Rep. of Germany

[73] Assignees: Didier Ofu Engineering GmbH; Krupp Koppers GmbH, both of Essen; Still Otto GmbH, Bochum, all of Fed. Rep. of Germany

[21] Appl. No.: 776,278
[22] PCT Filed: May 23, 1990
[86] PCT No.: PCT/EP90/00838
    § 371 Date: Nov. 22, 1991
    § 102(e) Date: Nov. 22, 1991
[87] PCT Pub. No.: WO90/14408
    PCT Pub. Date: Nov. 29, 1990

[30] Foreign Application Priority Data

May 26, 1989 [DE] Fed. Rep. of Germany ....... 3917122

[51] Int. Cl.⁵ .................... C10B 5/16; C10B 21/18
[52] U.S. Cl. .................... 202/139; 202/141; 202/144; 202/151
[58] Field of Search ............. 202/139, 151, 141–144

[56] References Cited

U.S. PATENT DOCUMENTS

| | | | |
|---|---|---|---|
| 2,845,385 | 7/1958 | Van Ackeren | 202/144 |
| 4,061,544 | 12/1977 | Van Ackeren et al. | 202/141 |
| 4,704,195 | 11/1987 | Janicka et al. | 202/139 |
| 5,017,270 | 5/1991 | Janicka et al. | 202/139 |

Primary Examiner—Joye L. Woodard
Attorney, Agent, or Firm—McGlew and Tuttle

[57] ABSTRACT

According to the invention the heating system for regenerative coke oven batteries that can be heated with rich gas and/or lean gas or mixed gas is provided comprising vertical flues cooperating in pairs, each vertical flue being connected to a regenerator for preheating the air and, in the case of lean gas operation, for preheating the lean gas or mixed gas. High and low combustion stages, as well as structure defining an internal flue gas return at levels above a flue base are provided. Discharge openings are provided at at least three levels for supplying each flue. A base discharge opening is provided at the flue base directly connected to regenerators. Hollow communicating channels are defined for connecting the regenerators to discharge openings located above the flue base. The hollow communicating channels are preferably formed in each communicating wall connected to a discharge opening leading only to one adjacent flue. The regenerators for preheating air are subdivided in a longitudinal direction of the oven with one part being connected to the base openings at the flue base and another part being connected to the hollow communicating channels. A regulating system is provided for setting the amount of air for the two parts separately. Pressure blocks are provided for setting the air distribution at the discharge openings provided above the flue base. The circulating flow openings are arranged at the foot of each flue in a hollow communicating wall between adjacent flues to provide ascending and descending flow.

6 Claims, 4 Drawing Sheets

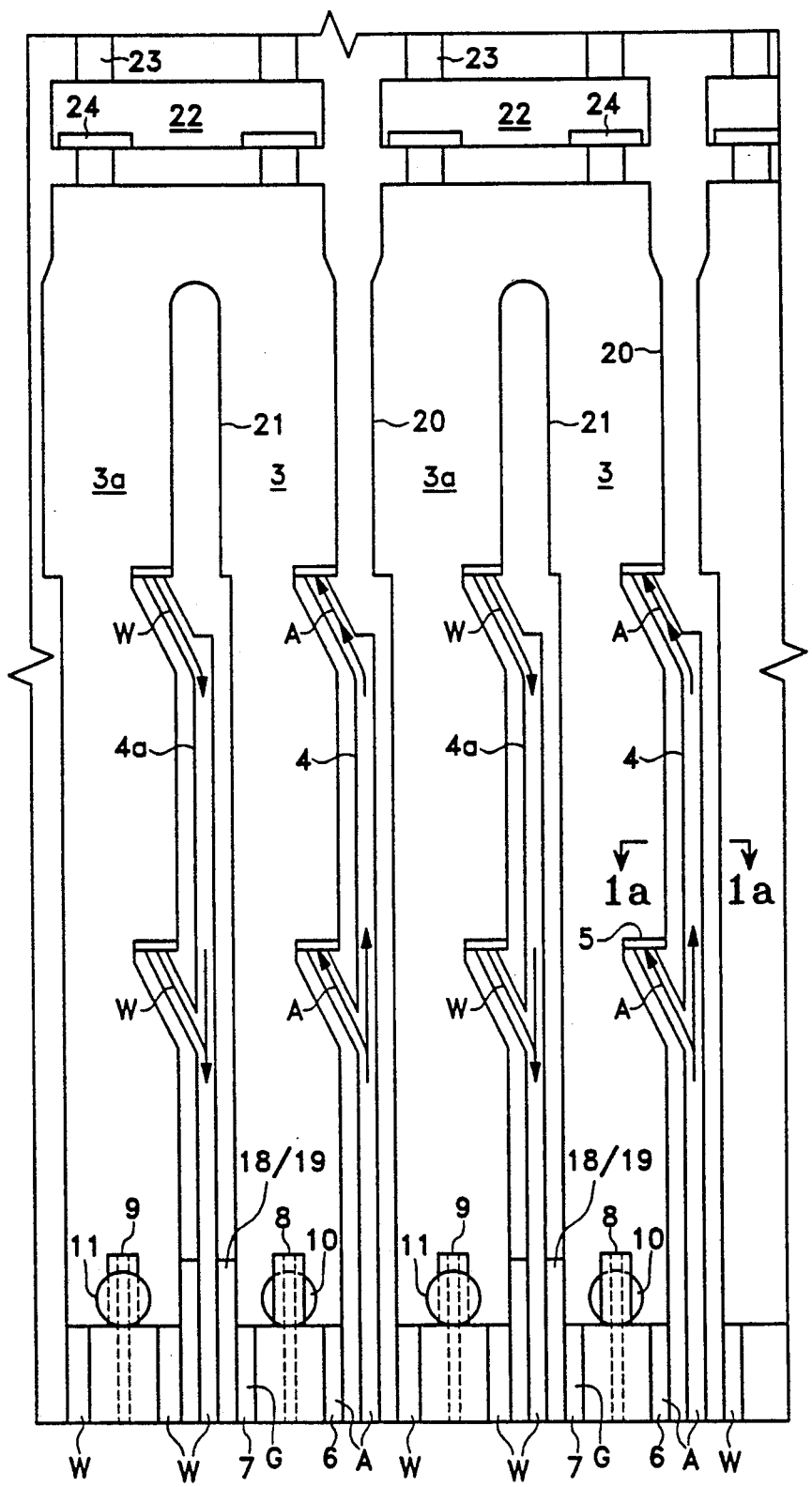
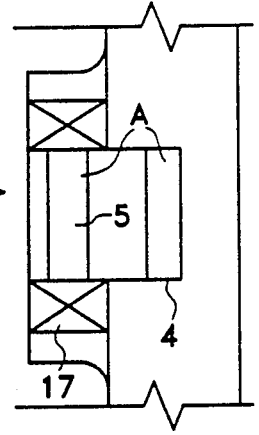
Fig. 1a
Fig. 1

HEATING SYSTEM FOR REGENERATIVE COKE OVENS

FIELD OF THE INVENTION

The present invention pertains to a heating system for regenerative coke oven batteries that can be heated with rich gas and/or lean gas or mixed gas, with vertical flues cooperating in pairs, the flues being connectable to regenerators for preheating the air and, in the case of lean gas operation, also connectable with regenerators for preheating the lean gas or mixed gas, high and low combustion stages, as well as with an internal flue gas return at levels of the flue base.

BACKGROUND OF THE INVENTION

A heating system with flues cooperating in pairs, air supply stages located high and low, as well as a flue gas return at the level of the flue base, has been known from European Patent Application No. 0,183,908. In these only two air supply stages over the height of the flue, the supply of air and gas at the base of each flue forms the first stage, and the supply via hollow communicating channels and discharge slots, located at the same height for both adjacent flues, forms the second stage. Heating with only two air supply stages is not sufficient for optimal combustion and for minimizing the $NO_x$ formation in coke ovens with a chamber height exceeding, e.g., 4 m.

SUMMARY AND OBJECTS OF THE INVENTION

The primary object of the heating system according to the present invention is to achieve uniform heating of the oven chambers with the smallest possible amount of $NO_x$ formation even in the case of a greater oven height, wherein optimal control of each individual combustion stage is possible even during ongoing operation, especially after a change from one type of gas to another.

This new heating system is characterized especially by the fact that the amount of the combustion air supplied at three or more levels can be adjusted from the outside for each individual stage even during ongoing operation. The three-stage or more than three-stage air supply permits both multistage combustion or heating of the oven chambers over the height and—to reduce the nitrogen oxide formation—also substoichiometric combustion in the lower combustion zones of the flue, as well as lower flame temperatures. At the same time, a further possibility for reducing the nitrogen oxide emission is fully utilized via flue gas return, besides the stepwise admission of the combustion air.

Besides the internal return with the so-called circulating flow openings, the return of relatively cold flue gases from the smokestack canal and mixing it with the combustion air is suggested according to the present invention as an external flue gas return. Especially the returned flue gas can be mixed with the combustion air and heated to the preheating temperature in the regenerators.

To achieve optimal combustion control in the ascending flues, it is suggested according to the present invention that the rich gas nozzles to which gas is admitted during one heating period be arranged in the longitudinal direction of the oven in one plane in the vicinity of one traveling wall in front of the corresponding circulating flow openings, and the rich gas nozzles to which gas is admitted during the other heating phase be also arranged in the longitudinal direction of the oven in one plane in the vicinity of the other traveling wall in front of the corresponding circulating flow openings.

It was also found to be favorable to arrange only one discharge opening, which is connected to a regenerator carrying lean gas or mixed gas, at the flue base in each flue, to supply the weak gas or mixed gas into each flue. In view of the fact that this gas usually burns with a longer flame, sufficient heating of the oven charge can be achieved with this exclusive gas supply at the flue base even in the case of taller chambers. The discharge openings at the flue base for both the air and optionally for the lean gas or mixed gas are preferably arranged exactly in the middle of the flue between the two corresponding traveling walls.

As an advantageous embodiment, it is suggested for a heating system of a twin flue type that a hollow communicating channel with discharge openings leading only to one adjacent flue be arranged in each communicating wall. The circulating flow openings should be arranged according to the present invention in the communicating walls which are located between ascending and descending flues of one twin flue group.

To set the amount of the combustion media over the length of the regenerators, adjustable and/or interchangeable regulating plates are arranged under these and above the regenerator base channels. In addition, the individual regenerators are subdivided by cell walls extending in the longitudinal direction of the battery into sections which are connected to a flue each in the two adjacent heating walls. As a result, each twin flue with the regenerator section associated with it forms one heating unit, so that the supply of combustion air and lean gas or mixed gas to each individual heating unit can be adjusted.

BRIEF DESCRIPTION OF THE DRAWINGS

In the drawings:

FIG. 1 is a vertical sectional view taken in the longitudinal direction of the heating wall through part of a heating wall with two adjacent twin flue groups, FIG. 1a is a cross sectional view taken along line 1a—1a of FIG. 1.

DETAILED DESCRIPTION OF THE PREFERRED EMBODIMENTS

Figure 2:
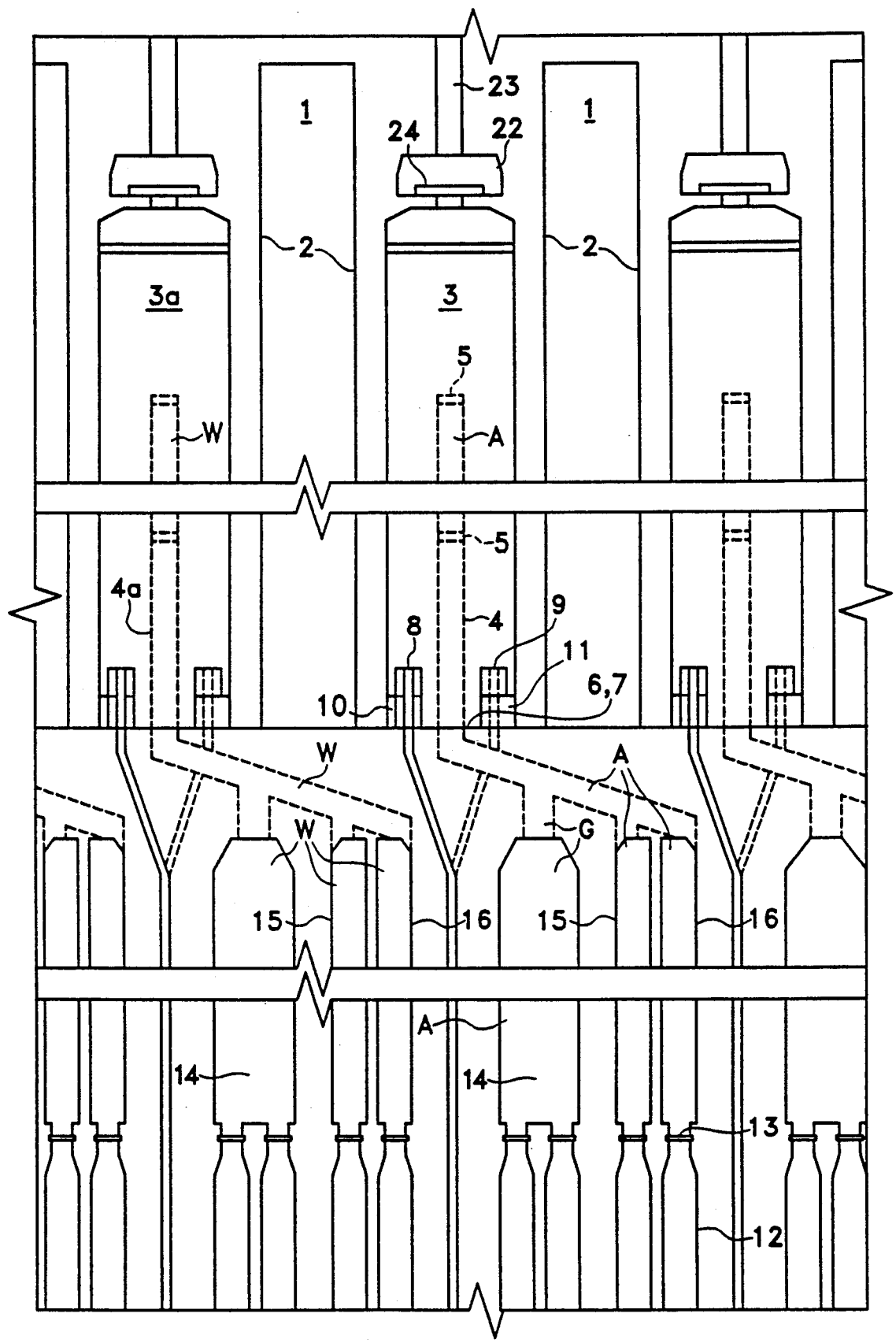
FIG. 2 is a vertical sectional view taken in the longitudinal direction of the battery through some heating walls with associated oven chambers and regenerators.
Figure 3:
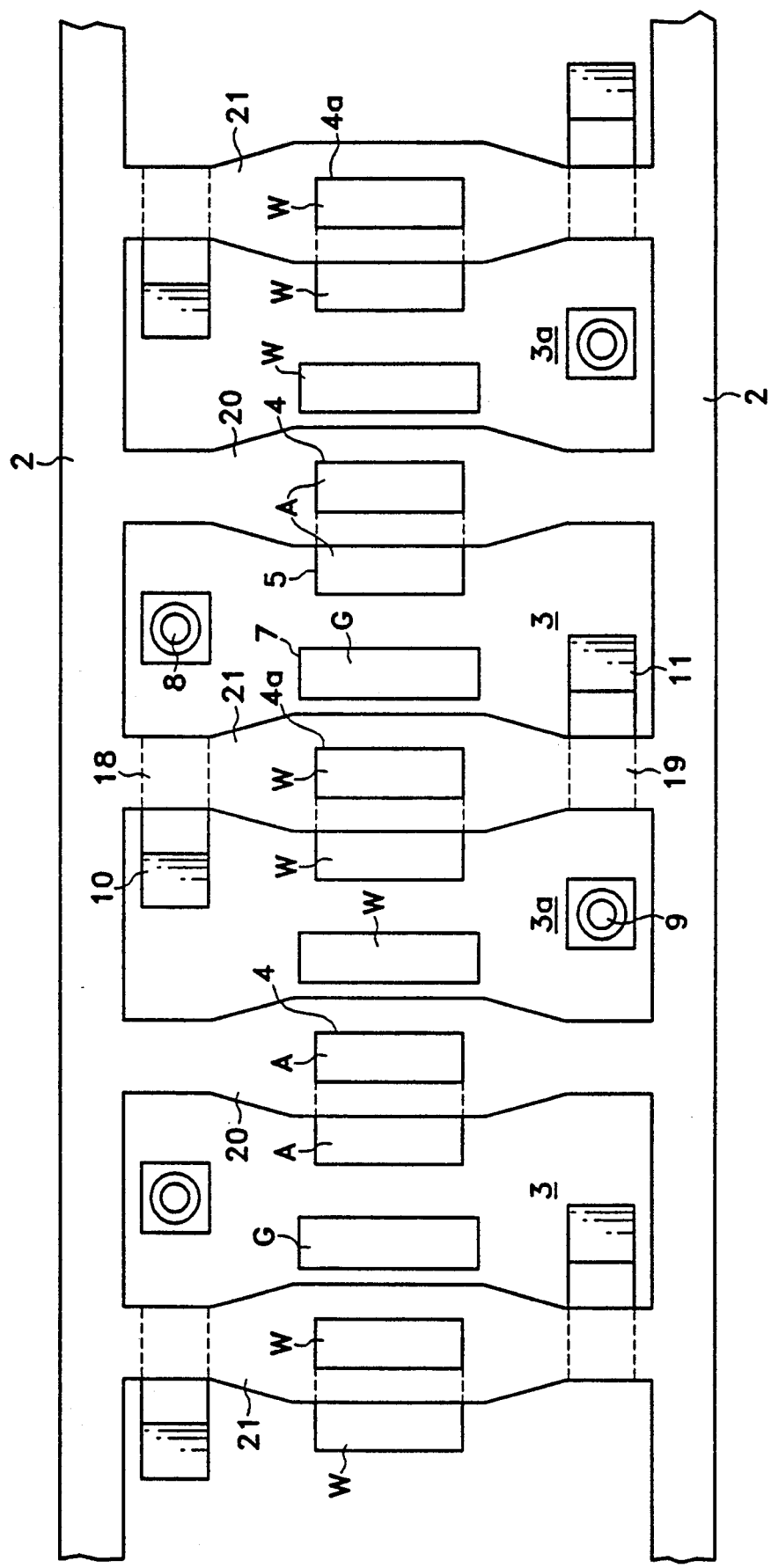
FIG. 3 is a horizontal sectional of view taken through a part of a heating wall.

The figures show a so-called compound oven, which can be optionally heated with rich gas G or lean gas G or mixed gas G. For exclusive rich gas operation, the rich gas G is supplied to the ascending flues 3 alternatingly via the rich gas nozzles 8 or 9. The combustion air A is also fed into the ascending flues via the regenerator base channels 12, the regulating plates 13, the regenerators 14, 15, 16, and the discharge openings 5 through 7. The air A thus enters the flue base from the regenerator 14 via the discharge openings 7; the air A from the regenerator 15 reaches the flue base via the discharge opening 6; and the air A from the regenerator 16 enters the ascending flue 3 via the hollow communicating channels 4 and the two upper discharge openings 5 between two opposite side walls or traveling walls 2.

Two adjacent ascending and descending flues 3, 3a are integrated into one twin flue from the viewpoint of heating, and one of these flues (ascending flue) is exposed to the flame alternatingly, the other flue discharges the flue gases W (exhausting flue).

In the case of lean gas heating, a lean gas G or a mixed gas G from blast-furnace gas and coke oven gas is preheated in the regenerators 14, and fed to the flue base via the discharge opening 7. To supply the combustion air A, at least three openings are provided at different levels in each flue: one discharge opening 6 is located in the flue base and two or more discharge openings 5 are located at a communicating wall 20, 21 at different heights. To make it possible to adjust the combustion air, supply A, in the individual stages to the requirements of the operation, especially in the case of change from one type of gas to another, the air regenerators 15, 16 are connected to the flue by one of separate base channels and, the communicating channels 4 formed in a guide wall. One regenerator side 15 supplies the bottom outlets 6 in the flue with combustion air, and the other regenerator 16 supplies the upper communicating wall discharge openings 5. The admission of gas to the discharge openings (bottom outlets) 6 at the flue base, on one hand, and to the upper discharge openings 5, on the other hand, can thus be set outside the oven, and changed over in the case of a change from one type of gas to another.

The waste gases W generated in the ascending flues 3 pass over into the adjacent descending flue 3a through openings in the upper part of the communicating walls, and are removed via the openings 5 and the hollow communicating channels 4a, as well as the bottom openings 6, 7 of this flue, the corresponding regenerators 14, 15 16, and the base channels 12.

Waste gas W flows through all metering cross sections for lean gas G or combustion A air after changing over the heating. This leads to an analogous distribution among the regenerators for this medium. These regenerators are thus again heated uniformly, and the waste gases W are cooled uniformly. Should it become necessary to change the amounts of combustion air A between the two upper discharge openings 5, this can be done by changing the discharge openings e.g., by means of pusher blocks 17, cf. FIG. 1a.

As further measures in addition to the stepwise supply of the combustion air A, internal and external returns of flue gas W are provided in order to minimize the formation of nitrogen oxides. For the internal flue gas W return, two so-called circulating flow openings 18, 19 are provided in the lower part of every other communicating wall 21. Even though buoyancy occurs in both flues, it is greater in the ascending flue 3. Thus a pressure, gradient develops at the foot of the flues, so that flue gases W will flow over there from the descending flue 3a into the ascending flue 3.

To achieve the greatest possible effect in terms of the reduction of the amount of nitrogen oxides formed with the internal flue gas return, the rich gas nozzles 8, 9 are arranged in front of respective circulating flow openings 18, 19, so that the coke oven gas can be enveloped or mixed with returned waste gas W beneath the actual combustion zone. If needed, the circulating flow openings 18, 19 can be closed by means of adjusting rollers 10, 11 provided on the flue base.

For external flue gas return, relatively cold flue gases W are returned from the smokestack canal, and they are mixed with the combustion air A, as a result of which the flue gases W mixed in are also heated in the regenerators to the preheating temperature, which is slightly below the flue temperature. The flue gases W are returned by means of blowers, and the waste gases W are taken from one of the smokestack canals of two adjacent batteries via reversible lines.

Since no waste gases W are produced during the periodic heating changeover of the battery, exhaust is first switched over to the smokestack canal of the respective other battery. The waste gases W are subsequently mixed with the combustion air A, which is also drawn in by means of blowers for this reason and is fed via lines or channels to the batteries. The forced circulation of the returned waste gases W with the combustion air A makes it additionally possible to use filtered leakage gases drawn in above the coke oven doors as combustion air A. By supplying the combustion air A under pressure via lines and stopcocks, advantages in terms of the possibility of accurate control of the total amount and of metering of the individual streams can be expected.

On the whole, among other things, the possibility of accurately controlling the amount of air makes it possible to accurately control the temperature program in the flues and to accurately set the air excess coefficient at the individual combustion stages, as a result of which the amount of nitrogen oxide produced can be expected to be reduced.

FIG. 1 additionally shows the alternating arrangement of continuous communicating walls 20, which separate two twin flue groups from one another, and short communicating walls 21. A differential channel 22, to which gas can be admitted on opening of the pushers 24 to additionally heat a higher oven zone, is located above a twin flue group. A peephole 23 is located above each flue, among other things, in order to monitor the temperatures in the flues and to adjust the pusher blocks 17 and the adjusting rollers 10, 11.

Figure 4:
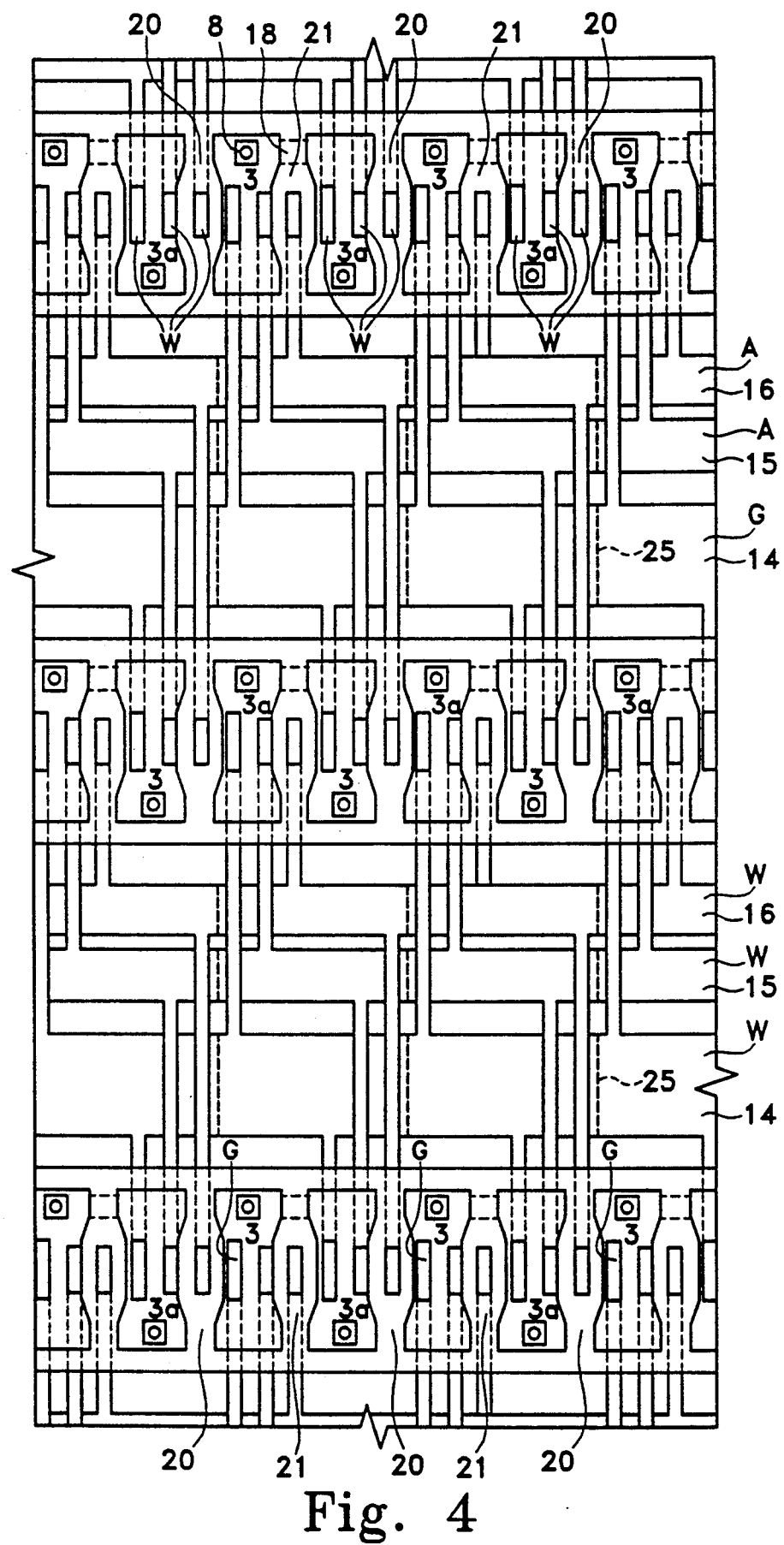
FIG. 4 is a horizontal sectional of view taken through a part of a plurality of heating walls arranged next to one another with schematically indicated, associated regenerators and the supply channels to the heating walls.

The regenerator cell walls 25 drawn in broken lines in FIG. 4 should also be mentioned.

While a specific embodiment of the invention has been shown and described in detail to illustrate the application of the principles of the invention, it will be understood that the invention may be embodied otherwise without departing from such principles.

We claim:

1. A heating system for regenerative coke oven batteries that can be heated with rich gas and/or lean gas or mixed gas, comprising;

a base wall, an upper wall and side walls defining at least one cooperating pair of vertical flues, said sidewalls including a short communicating wall dividing said cooperating pair of vertical flues and extending from said base wall to a location spaced from said upper wall and a continuous communicating wall extending from said base wall to said upper wall, each of said short communicating wall and said continuous communicating wall defining a hollow communicating channel, each said hollow communicating channel including discharge openings at two different levels above said base wall, said discharge openings of said continuous communicating wall leading only to a first flue of said cooperating pair of vertical flues and said discharge openings of said short communicating wall leading only to a second flue of said cooperating pair of vertical flues;

flue base communicating channel means formed in said flue base wall defining a channel with a flue base discharge opening connected to said first flue, regenerators for preheating air, said regenerators being subdivided in a longitudinal direction of said heating system to provide a first regenerator part with a first regenerator part connection and a second regenerator part with a second regenerator part connection, said first regenerator part connection being connected to said flue base communicating channel means and said second regenerator part connection being connected to said hollow communicating channel of said continuous communicating wall, allowing adjustment of amounts of air therebetween;

pusher block means provided at each of said discharge openings of said one of said hollow communicating channels for regulating gas flow therethrough; and a base opening provided in said short communicating wall between the cooperating pair of vertical flues for providing communication between said second flue and said first flue adjacent said base wall.

2. A heating system according to claim 1, further comprising a first heating period rich gas nozzle providing a rich gas connection to one flue of said pair of cooperating flues said first heating period rich gas nozzle connection being in front of said base opening and a second heating period rich gas nozzle providing a rich gas connection to the other flue of said pair of cooperating flues, said second heating period rich gas nozzle connection being in front of said base opening.

3. A heating system according to claim 1, wherein said flue base communicating channel means defines an additional discharge opening connected to an additional regenerator for supplying lean gas or mixed gas.

4. A heating system according to claim 3, wherein said base discharge opening and said additional discharge opening are arranged between said continuous communicating wall and said short communicating wall.

5. A heating system according to claim 1, further comprising regenerator base channels connected to said first and second regenerator parts and regulating plates arranged under said first and second regenerator parts and above said regenerator base channels.

6. A heating system according to claim 1, wherein each of said first regenerator part and said second regenerator part includes a cell wall to divide said first regenerator part and to divide said second regenerator part.

* * * * *